US009917759B2

(12) United States Patent
Gamage

(10) Patent No.: US 9,917,759 B2
(45) Date of Patent: Mar. 13, 2018

(54) INCIDENT-BASED ADAPTIVE MONITORING OF INFORMATION IN A DISTRIBUTED COMPUTING ENVIRONMENT

(71) Applicant: Nimal K. K. Gamage, Fort Collins, CO (US)

(72) Inventor: Nimal K. K. Gamage, Fort Collins, CO (US)

(73) Assignee: CA, Inc., New York, NY (US)

( * ) Notice: Subject to any disclaimer, the term of this patent is extended or adjusted under 35 U.S.C. 154(b) by 368 days.

(21) Appl. No.: 14/336,861

(22) Filed: Jul. 21, 2014

(65) Prior Publication Data

US 2016/0020976 A1 Jan. 21, 2016

(51) Int. Cl.
G06F 15/16 (2006.01)
H04L 12/26 (2006.01)
H04L 12/24 (2006.01)

(52) U.S. Cl.
CPC ............ H04L 43/12 (2013.01); H04L 41/06 (2013.01); H04L 43/103 (2013.01); H04L 43/16 (2013.01)

(58) Field of Classification Search
CPC ......... H04L 43/08; H04L 43/10; H04L 43/04; H04L 43/0876; H04L 43/16; H04L 43/12; H04L 43/103; H04L 41/06
USPC ................................................. 709/224–245
See application file for complete search history.

(56) References Cited

U.S. PATENT DOCUMENTS

| | | | |
|---|---|---|---|
| 6,944,681 B1 * | 9/2005 | Christensen .......... | H04L 12/403 710/17 |
| 7,712,083 B2 * | 5/2010 | Coppert ................ | G06F 11/008 463/42 |
| 9,075,844 B1 * | 7/2015 | Thayer ................. | G06F 11/3051 |
| 2002/0169857 A1 * | 11/2002 | Martija ................. | H04L 29/06 709/220 |
| 2004/0218685 A1 * | 11/2004 | Rainbolt .................. | H04L 1/04 375/267 |
| 2005/0182969 A1 * | 8/2005 | Ginter ..................... | G06F 21/55 726/5 |
| 2005/0223092 A1 * | 10/2005 | Sapiro ................. | H04L 41/0631 709/224 |
| 2006/0294221 A1 * | 12/2006 | Graupner .............. | H04L 43/067 709/224 |
| 2007/0087741 A1 * | 4/2007 | Noble ................. | H04B 17/0085 455/423 |
| 2011/0016156 A1 * | 1/2011 | Golobay ............. | H04L 41/0803 707/803 |
| 2011/0106938 A1 * | 5/2011 | Gopisetty ........... | G06F 11/3495 709/224 |
| 2015/0355990 A1 * | 12/2015 | Cole .................... | G06F 11/3089 702/186 |

* cited by examiner

*Primary Examiner* — David Lazaro
*Assistant Examiner* — Berhanu Shitayewoldetadik
(74) *Attorney, Agent, or Firm* — Baker Botts L.L.P.

(57) ABSTRACT

According to one embodiment of the disclosure, a system monitors a first metric associated with a host device. The system accesses, at a monitoring frequency, data associated with the first metric. The system determines, based on the data, a metric rating for the first metric. The system further determines, based on the metric rating, whether the metric rating is above a threshold. The system modifies, based at least in part on the metric rating being above the threshold, a monitoring behavior of a probe.

17 Claims, 4 Drawing Sheets

| TIME | CURRENT VALUE | STATE |
|---|---|---|
| 3:00 PM | XX | NORMAL |
| 3:05 PM | XX | WARNING |
| 3:09 PM | XX | WARNING |
| 3:13 PM | XX | MINOR |
| 3:16 PM | XX | MAJOR |
| 3:18 PM | XX | MAJOR |
| 3:20 PM | XX | CRITICAL |
| 3:21 PM | XX | MINOR |
| 3:23 PM | XX | NORMAL |
| 3:28 PM | XX | NORMAL |

FIG. 4

INCIDENT-BASED ADAPTIVE MONITORING OF INFORMATION IN A DISTRIBUTED COMPUTING ENVIRONMENT

BACKGROUND

The present disclosure relates generally to monitoring entities, and more specifically to incident-based adaptive monitoring of information in a distributed computing environment.

A distributed computing environment typically utilizes various computing systems that may communicate over a network while performing various operations. One or more of these computing systems may be associated with information that may be monitorable.

BRIEF SUMMARY

In certain embodiments, a system monitors a first metric associated with a host device. The system accesses, at a monitoring frequency, data associated with the first metric. The system determines, based on the data, a metric rating for the first metric. The system further determines, based on the metric rating, whether the metric rating is above a threshold. The system modifies, based at least in part on the metric rating being above the threshold, a monitoring behavior of a probe.

Other objects, features, and advantages of the present disclosure are apparent to persons of ordinary skill in the art in view of the following detailed description of the disclosure and the accompanying drawings.

BRIEF DESCRIPTION OF THE DRAWINGS

Aspects of the present disclosure are illustrated by way of example and are not limited by the accompanying figures with like references indicating like elements.

FIG. 4 illustrates an example of data stored in a database by a probe for incident-based adaptive monitoring of information in a distributed computing environment according to one embodiment of the present disclosure.

DETAILED DESCRIPTION

Figure 1:
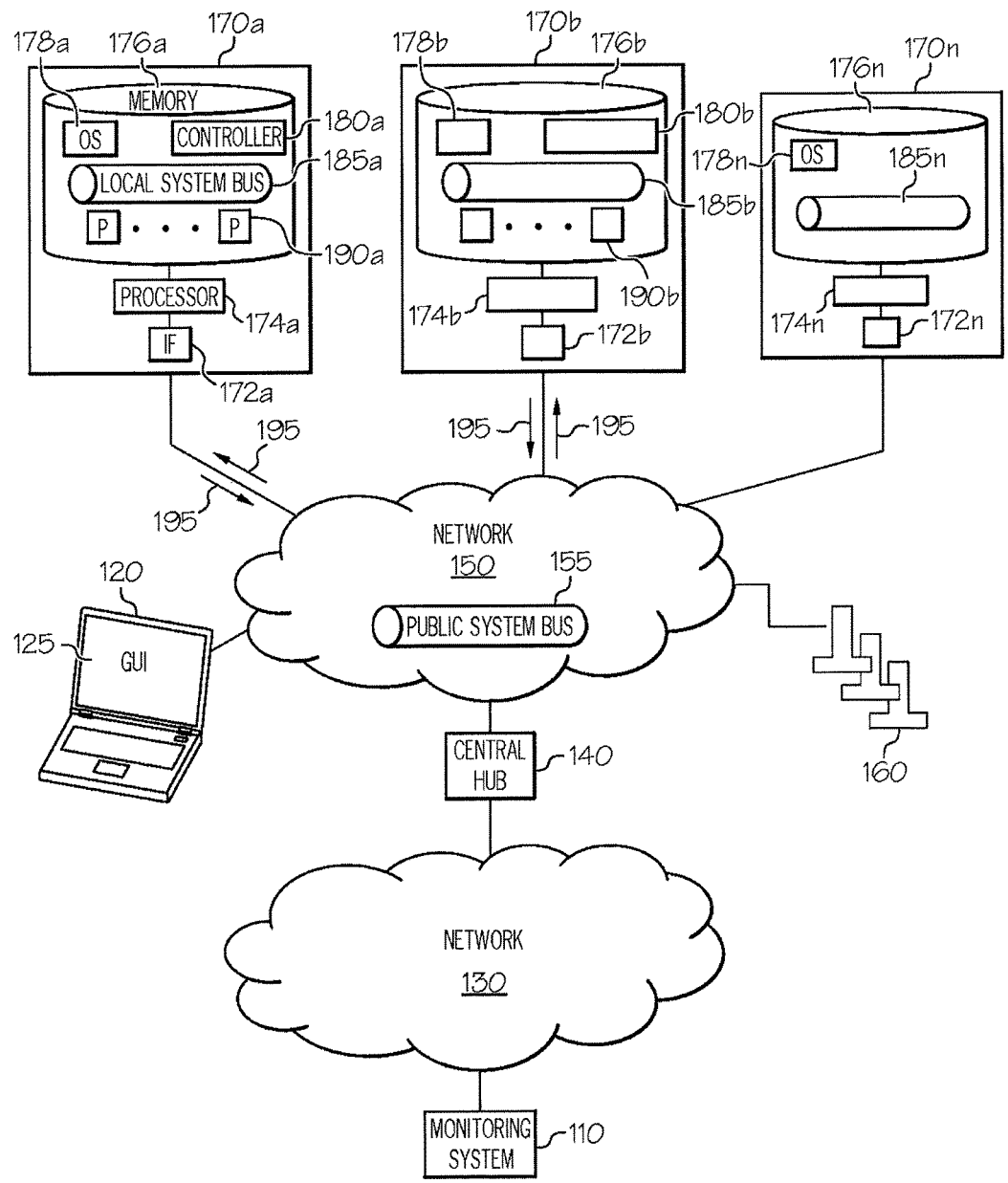
FIG. 1 illustrates an example of a system for incident-based adaptive monitoring of information in a distributed computing environment according to one embodiment of the present disclosure.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA®, SCALA®, SMALLTALK®, EIFFEL®, JADE®, EMERALD®, C++, C#, VB.NET, PYTHON® or the like, conventional procedural programming languages, such as the "C" programming language, VISUAL BASIC®, FORTRAN® 2003, Perl, COBOL 2002, PHP, ABAP®, dynamic programming languages such as PYTHON®, RUBY® and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Referring now to FIG. 1, FIG. 1 illustrates an example of a system 100 for incident-based adaptive monitoring of information in a distributed computing environment according to certain embodiments of the present disclosure. As illustrated, system 100 includes host devices 170 and probes 190 configured to monitor a corresponding host device 170.

In general, probes 190 facilitate the monitoring of host devices 170 by monitoring metrics associated with host devices 170, publishing or otherwise communicating data associated with those metrics (e.g., potentially for access by other probes 190), and modifying their monitoring behavior based on the communicated data. For example, a probe 190 may be configured to perform any suitable combination of the following: (1) monitor one or more metrics associated with a host device 170; (2) access data associated with the one or more metrics with a certain frequency; (3) determine a metric rating for the one or more metrics; (4) determine whether the metric rating is above a threshold, which may indicate the occurrence of an incident; (5) generate an alert indicating an incident if the metric rating is above the threshold; (6) publish or otherwise communicate the incident via the alert to other probes 190; (7) receive (e.g., detect, listen for, etc.) new alerts indicating incidents detected by other probes 190; (8) communicate data associated with the one or more metrics in response to detecting new alerts; (9) modify a monitoring behavior based at least in part on generating and/or receiving a new alert (e.g., based on an incident); and perform other suitable operations.

Probe 190 may be one of a plurality of probes 190 deployed throughout a distributed computing environment to monitor any suitable combination of computing devices (e.g., host devices 170), other probes 190, any other component of system 100, and any other monitorable entity. As just a few particular examples, probe 190 may monitor a computer, software, a monitorable service, a thermostat, a motion detector, a data infrastructure, a networking device, any other device accessible to system 100, and/or any other suitable entity. In certain embodiments, multiple probes 190 throughout system 100 gathering their own data for alerts, as well as listening for other alerts, and performing actions based on the detected and received alerts from other probes 190, may provide a more robust system 100 that allows probes 190 to work together to identify, isolate, analyze, and react to incidents associated with those alerts throughout the distributed computing environment.

For example, a particular probe 190 may detect an alert condition based on a monitored metric exceeding a particular threshold, and the particular probe 190 may publish the detected alert, along with any other suitable information that may be useful in analyzing the alert, to other probes 190 throughout system 100. The other probes 190 that access the published alert may then review their own monitored data (or other suitable data) in view of the received alert, and determine whether any additional information (e.g., their own alert and associated information) should be published to other probes throughout system 100.

As more and more probes 190 react to a particular incident by generating their own alerts, it may become more clear that there is a serious problem within the distributed computing environment. In contrast, in certain embodiments, when a single probe 190 generates an alert indicating a particular incident and no (or a relatively limited number of) other probes 190 react to the particular incident, it may become apparent that there is not a problem to address (or at least that the detected incident may be local to the particular probe 190 that detected the incident). Further, as probes 190 discontinue publishing information regarding a particular incident, it may become more clear that a previous problem no longer exists.

In general, any information (or data) associated with host devices 170 may be monitored, such as information regarding hardware, firmware, and/or software installed on or otherwise accessible to a host device 170; information regarding any host device 170 and/or any other devices connected to one or more networks; information regarding virtualization associated with host device 170; information regarding storage associated with a host device 170; information regarding cloud computing associated with a host device 170; any other information associated with a host device 170; any other suitable information; or any combination of the preceding. By monitoring information associated with host devices 170, probes 190 may gather such information for various purposes. For example, at least a portion of the monitored information may be provided to various other probes 190, at least a portion of the monitored information may be stored (such as for later use and/or for later reference), at least a portion of the monitored information may be processed, grouped, characterized, and/or summarized for view by a user, at least a portion of the monitored information may be compared to one or more thresholds, any other suitable use of the monitored information, or any combination of the preceding.

Host device 170 represents any components operable to process information, and may be implemented using any suitable combination of hardware, firmware, and software. Host device 170 may include any suitable type of computer system, such as a network server, any remote server, a mainframe, a host computer, a workstation, a web space server, a personal computer, a file server, a virtual device, or any other device that may electronically process information. The operations of host device 170 may be performed by any combination of one or more servers or other components at one or more locations. In the embodiment where the module is a server, the server may be a private server, and the server may be a virtual or physical server. The server may include one or more servers at the same or remote locations. Also, host device 170 may include any component that functions as a server. Host device 170 may include an operating system 178 that manages resources and provides services for computer programs installed on host device 170, in certain embodiments. Host device 170 may include (and/or may otherwise be associated with) information that may be monitored by probes 190. In the illustrated embodiment, host device 170 includes a network interface 172, a processor 174, and a memory 176.

Network interface 172 represents any components operable to receive information from network 150, transmit information through network 150, perform processing of information, communicate to other devices, or any combination of the preceding, and may be implemented using any suitable combination of hardware, firmware, and software. For example, network interface 172 may receive information from public system bus 155. As another example, network interface 150 may communicate information for display to a user on user device 120. Network interface 172 represents any port or connection, real or virtual, including any suitable hardware and/or software, including protocol conversion and data processing capabilities, to communicate through a LAN, a metropolitan area network (MAN), a WAN, or other communication system that allows a probe 190 of a host device 170 to exchange information with other probes 190 of host devices 170, network 150, user device 120, information database 160, or any other component of system 100. Although FIG. 1 illustrates system 100 as including only three network interfaces 172 (e.g., network interface 172a, network interface 172b, and network interface 172n), system 100 may include any number of network interfaces 172.

Processor 174 communicatively couples to network interface 172 and memory 176, and controls the operation and administration of host device 170 by processing information received from network interface 172 and memory 176. For example, processor 174 executes operating system 178 to manage resources and provide services for one or more applications and/or computer programs. Processor 174 may be a programmable logic device, a microcontroller, a microprocessor, any processing device, or any combination of the preceding. Although FIG. 1 illustrates system 100 as including only three processors 174 (e.g., processor 174a, processor 174b, and processor 174n), system 100 may include any number of processors 174.

Memory 176 stores, either permanently or temporarily, data, operational software, or other information for processor 174. Memory 176 includes any one or a combination of volatile or non-volatile local or remote devices suitable for storing information. For example, memory 176 may include RAM, ROM, magnetic storage devices, optical storage devices, or any other information storage device or a combination of these devices. While illustrated as including particular modules, memory 176 may include any information for use in the operation of host device 170. Although FIG. 1 illustrates system 100 as including only three memories 176 (e.g., memory 176a, memory 176b, and memory 176n), system 100 may include any number of memories 176.

In the illustrated embodiment, memory 176 includes operating system 178, controller 180, local system bus 185, and probes 190. Operating system 178 represents any suitable set of instructions, logic, or code embodied in a computer readable storage medium and operable to manage resources and provide services for one or more applications and/or computer programs. Operating system 178 may include any suitable operating systems, such as IBM's zSeries/Operating System (z/05), MS-DOS, PC-DOS, MAC-OS (such as MAC OS X), WINDOWS, UNIX, OpenVMS®, LINUX®, SOLARIS, ADVANCED INTERACTIVE EXECUTIVE (AIX), HP-UX®, UBUNTU®, DEBIAN®, or any other appropriate operating systems, including future operating systems. Although FIG. 1 illustrates system 100 as including only three operating systems 178 (e.g., operating system 178a, operating system 178b, and operating system 178n), system 100 may include any number of operating systems 178.

Controller 180 represents any suitable set of instructions, logic, or code embodied in a computer readable storage medium and operable to control any number of probes 190. The present disclosure contemplates controller 180 being operable to control any aspect of probes 190. For example, controller 180 may control: which probes 190 are installed on a host device 170 (such as by installing, re-installing, and/or uninstalling particular probes 190 on a host device 170); when probes 190 monitor information associated with a host device 170; the type of information that probes 190 monitor for; any transmission of the monitored information over network 150 (such as when a transmission may occur and what information may be included in a transmission); the monitoring behavior of probes 190; any other aspect associated with probes 190; or any combination of the preceding. In certain embodiments, controller 180 may further control any aspect regarding the monitoring of information associated with host devices 170.

Local system bus 185 generally facilitates the interaction and communication between probes 190 by coupling the components of host device 170 to each other. Local system bus 185 may represent any suitable bus structure, such as one or more memory buses, peripheral buses, local buses, or any combination thereof, having any suitable bus architecture. Example bus architectures include Industry Standard Architecture (ISA) bus, Enhanced ISA (EISA) bus, Micro Channel Architecture (MCA) bus, Video Electronics Standards Association local (VLB) bus, Peripheral Component Interconnect (PCI) bus, PCI-Express (PCI-X) bus, and Accelerated Graphics Port (AGP) bus. Local system bus 185 (such as local system bus 185a, local system bus 185b, and local system bus 185n) is generally accessible to any probe 190 of system 100. For example, each probe 190 may publish data to local system bus 185 and/or listen for data published to local system bus 185 by other probes 190 of host device 170.

Probes 190 represent any suitable set of instructions, logic, or code embodied in a computer readable storage medium and operable to monitor host devices 170. Probes 190 may coordinate with, communicate with, or otherwise interact with each other to facilitate the monitoring of information associated with host devices 170. Further, each probe 190 may perform a particular operation associated with monitoring information. For example, a first probe 190 may monitor for a first metric (e.g., first type of information), while a second probe 190 (and any other subsequent probes 190) may monitor different metrics (e.g., different types of information). Additionally, or alternatively, a single probe 190 may perform multiple operations and/or may monitor multiple types of information.

In general, a metric may refer to the information being monitored by a probe 190. Additionally, or alternatively, a metric may be determined from one or more other metrics being monitored by probe 190. For example, a metric may be calculated based on the information being monitored. As another example, a metric may be calculated based on information from two different metrics being monitored.

The types of information that a probe 190 may monitor may include any suitable combination of: (1) network-based information; (2) application-based information; (3) virtualization-based information; (4) storage-based information; (5) cloud-based information; (6) quality of service information; (7) server-based information; (8) bandwidth information; (9) website-based information; and (10) any other suitable type of information. As an example, a probe 190 may monitor information regarding applications installed on host devices 170 (such as what applications are installed, what applications are currently running, what applications have expired service contracts, etc.), information regarding any host device 170 and/or any other devices connected to one or more networks (such as the Internet Protocol (IP) address of any host device, the Media Access Control (MAC) address of any host device, the user of a host device, etc.), information regarding virtualization associated with a host device 170 (such as how much processing power is being utilized by a host device 170, how much processing power is unused, etc.), information regarding storage associated with a host device 170 (such as how much storage is currently being used, how much storage is not being used, the type of storage (e.g., RAM, ROM, etc.), etc.), information regarding cloud computing associated with a host device 170 (such as what host devices 170 are implemented in cloud computing, the cost associated with cloud computing, etc.), any other information associated with a host device 170, or any combination of the preceding.

As a further example, probes 190 may monitor for incidents associated with host devices 170. As an example, one or more thresholds may be established for a metric of a host device 170 (such as a threshold of 80% processor usage), and when those thresholds are reached (or exceeded), an alert indicating an incident may be generated, which may be detected and/or generated by probes 190. Additionally, probes 190 may monitor information regarding incidents associated with a host device 170 (such as what types of incidents are being monitored for, what alerts have been generated, how long an alert has been generated for, etc.). Probes 190 may also monitor for any other data associated with a host device 170 (such as what service messages have been communicated, which metric a service message has been generated for, etc.).

In operation, probes 190 monitor host devices 170 by monitoring metrics associated with host devices 170, exchanging data associated with those metrics with each other, and adapting their monitoring behavior based on the monitored and/or exchanged data. To facilitate the monitoring of host devices 170, probes 190 may first access data associated with metrics at a monitoring frequency. At least a portion of the accessed data may be stored. For example, probes 190 may store the most recent blocks of accessed data in a buffer. In such an example, the buffer may comprise a cache that stores the accessed data for a pre-determined time (e.g., a minute, five minutes, ten minutes, an hour, and so on, on a first-in-first-out basis, on a last-in-first-out basis, or on any other suitable basis). When the pre-determined time for a block of data expires, that block may be overwritten with the most recent block of accessed data. The buffer may be internal or external to host devices 170. As an example, the buffer may be a part of memory 176, or the buffer may be a part of information database 160 or monitoring system 110. In certain embodiments, the buffer may be a component separate from any other component of system 100.

Additionally, or alternatively, probes 190 may communicate any of the accessed data to various components of system 100, such as other probes of network 150. In such an example, the monitored information may be communicated in any suitable manner, such as in the form of an alert (as described below) or a service message (which may include any data associated with a metric of a host device 170, such as, for example, a current value for the metric). In certain embodiments, the monitored information may be published to a buffer accessible to other probes 190.

Each probe 190 is generally operable to generate and/or detect alerts indicating incidents associated with various metrics or collections of metrics. For example, each probe 190 may generate an alert in response to a metric rating for a metric exceeding a threshold. In such an example, a probe 190 (such as one of probes 190a) may first determine a metric rating for a first metric associated with a host device 170 (such as host device 170a). The metric rating may be based at least in part upon previous metric ratings, a time of day, a day of the week, and/or a day of the year. For example, a probe 190 may determine (or otherwise be programmed with information reflecting) that a host device 170 is normally slow on certain days of the week and/or at certain times of the day, and may take that information into account when determining the metric rating. Thus, the metric rating may be time sensitive and vary over time.

In certain embodiments, the metric rating indicates a metric state. In certain embodiments, the metric rating may be a value that corresponds to a position on a spectrum of metric states. As an example, the spectrum of metric states may range from a normal state to increasing levels of criticality. As just a few examples, a metric state may include a normal state, warning state, minor-incident state, major-incident state, or critical state.

Once a metric rating has been determined, probe 190a may determine whether the metric rating exceeds an established threshold. In certain embodiments, a threshold for a host device 170 may be time sensitive and vary over time based at least in part upon a time of day, day of the week, day of the year, and so on. As a result, in certain embodiments, to determine whether a metric rating exceeds an established threshold, probe 190a may first determine which threshold to apply. For instance, probe 190a may determine that a host device 170 is normally slow on certain days of the week and/or at certain times of the day and take that information into account to determine an applicable threshold. After determining the applicable threshold, probe 190a may then determine whether the metric rating exceeds such threshold (e.g., determine whether host device 170 is particularly slow at this time on this day).

When the metric rating exceeds the threshold, probe 190a may generate a first alert (such as alert 195a) indicating a first incident and communicate alert 195a to, for example, local system bus 185 and/or public system bus 155. Alert 195a may include the metric rating, at least a portion of the data associated with the first metric, and/or a time stamp indicating when alert 195a was generated. The data in the alert may include, for example, the current measurement of the first metric and any lead-up data (e.g., historical data stored in memory 176 and/or information database 160).

In certain embodiments, probe 190 may generate an "all-clear" alert in response to a metric rating not exceeding an established threshold. For example, probe 190a may generate and communicate an "all-clear" alert to indicate to other probes that the metric rating for the metric no longer exceeds the threshold if probe 190a previously generated an alert 195a indicating a first incident. The "all-clear" alert may be communicated to the other probes via local system bus 185 and/or public system bus 155.

As another example, each probe 190 may detect an alert generated by another probe in response to a metric rating for another metric exceeding an established threshold. For example, probe 190a may detect a second alert (such as alert 195b) generated by another probe (such as one of probes 190b). Alert 195b may indicate a second incident associated with another host device (such as host device 170b) and may include a metric rating for a second metric, at least a portion of data associated with the second metric (e.g., current value of the second metric, lead-up data, etc.), and/or a time stamp indicating when alert 195b was generated. Thus, monitoring a host device 170 may further include, in addition or as an alternative to accessing data associated with a particular metric, listening for alerts (and/or service messages) generated for other metrics associated with host devices 170.

In general, system 100 may modify the monitoring behavior of a particular probe 190 based on data associated with any metric monitored by any probe of network 150. For example, the monitoring behavior of a probe 190 may be modified based at least in part on (1) probe 190 determining that a metric rating for a first metric associated with a host device 170 exceeds an established threshold and/or (2) another probe 190 determining that a metric rating for a second metric associated with the same host device 170 or another host device exceeds an established threshold.

Examples of modifying a monitoring behavior of probe 190 may include: (1) updating a monitoring frequency (e.g., accessing data associated with a metric more frequently or less frequently); (2) monitoring another metric associated with a host device 170 (e.g., accessing data associated with a second metric, determining a metric rating for the second metric, generating and communicating an updated alert that includes the metric rating and data associated with the second metric); (3) changing a threshold (e.g., increasing a threshold value, decreasing a threshold value, etc.); (4) changing a type of data for which probe 190 listens (e.g., instructing probe 190 to listen for a particular type of service message and/or particular type of alert that probe 190 previously did not listen for); (5) communicating a service message that includes data associated with a metric in response to generating and/or detecting an alert (e.g., communicating current data associated with a first metric and/or a second metric or stored data associated with a first metric and/or second metric); (6) instructing probe 190 to continue communicating data associated with a metric until a metric rating for the metric no longer exceeds a threshold (e.g., in response to generating an alert, communicating all accessed data as long as the metric rating still exceeds the threshold); (7) instructing probe 190 to continue communicating data associated with a metric for a pre-determined time after generating and/or detecting a new alert (e.g., communicating all data accessed within five minutes, ten minutes, and so on, of generating and/or detecting an alert); (8) changing any other monitoring behavior; or (9) any combination thereof. Although particular examples of modifying a monitoring behavior of probe 190 are described, the present disclosure contemplates probe 190 modifying a monitoring behavior based on any suitable combination of these or other appropriate modifications.

In certain embodiments, a monitoring behavior of probe 190 may be modified based at least in part on the metric state of the one or more metrics. For example, if a probe 190 determines a metric rating for a metric indicates a critical state, and a previous metric rating for the metric indicated a warning state, probe 190 may increase a monitoring frequency. Alternatively, if probe 190 determines a metric rating for the metric indicates a normal state, and the previous metric rating for the metric indicated a warning state, probe 190 may decrease the monitoring frequency.

Although FIG. 1 illustrates each host device 170 as including only two probes 190 (e.g., two probes 190a installed on host device 170a and two probes 190b installed on host device 170b), any number of probes 190 may be installed on a host device 170. For example, a host device 170 may include no probes 190, a single probe 190, ten probes 190, one hundred probes 190, one thousand probes 190, or any other number of probes 190.

Furthermore, although FIG. 1 illustrates system 100 as including only three host devices 170 (e.g., host device 170a, host device 170b, and host device 170n), system 100 may include any number of host devices 170. For example, system 100 may include a single host device 170, ten host devices 170, one hundred host devices 170, one thousand host devices 170, or any other number of host devices 170. Additionally, although host device 170 has been described above as including a controller 180 and probes 190, in certain embodiments, one or more host devices 170 may not include either a controller 180 and/or probes 190. For example, as illustrated in FIG. 1, host device 170n may not include either a controller 180 or any probes 190. Instead, if appropriate, one or more probes 190 installed on another host device 170 (such as host device 170a) may monitor information associated with host device 170n, in certain embodiments. Thus, probes 190 may be able to monitor any type of information associated with host device 170n (such as information regarding memory usage in host device 170n, processing capabilities in host device 170n, applications installed in host device 170n, or any other information) without probes 190 (or a controller 180) being installed on host device 170n.

In general, multiple probes 190 are deployed throughout system 100 to monitor host devices 170 and/or other probes 190. Having multiple probes 190 throughout system 100 gather their own data for alerts 195, as well as listen for other alerts 195, and modify their monitoring behavior based on generating alerts 195 and/or receiving other alerts 195 from other probes 190, may provide a more robust system 100 that allows probes 190 to work together to identify, isolate, analyze, and react to incidents throughout system 100.

Network 150 represents any network operable to facilitate communication between various components of system 100, such as host devices 170, user device 120, and information database 160. Network 150 may include any interconnecting system capable of transmitting audio, video, signals, data, messages, or any combination of the preceding. Network 150 may include all or a portion of a public switched telephone network (PSTN), a public or private data network, a LAN, a MAN, a WAN, a local, regional, or global communication or computer network such as the Internet, a wireline or wireless network, an enterprise intranet, or any other suitable communication link, including combinations thereof, operable to facilitate communication between the components. For example, in the illustrated embodiment, network 150 includes public system bus 155.

Public system bus 155 represents any component operable to couple probes 190, host devices 170, hub 140, monitoring system 110, or any other component of system 100, to each other. Public system bus 155 may represent any suitable bus structure, such as one or more memory buses, peripheral buses, local buses, or any combination thereof, having any suitable bus architecture. Example bus architectures include Industry Standard Architecture (ISA) bus, Enhanced ISA (EISA) bus, Micro Channel Architecture (MCA) bus, Video Electronics Standards Association local bus (VLB), Peripheral Component Interconnect (PCI) bus, PCI-Express (PCI-X) bus, and Accelerated Graphics Port (AGP) bus. Public system bus 155 is generally accessible to any probe 190 (or other component of system 100), and operable to facilitate communication and interaction between probes 190.

Hub 140 represents any component operable to link (though not necessarily physically) probes 190 (and/or controllers 180) to each other, and may be implemented using any suitable combination of hardware, firmware, and software. For example, hub 140 may allow a first probe 190 (such as probe 190a) to communicate with and/or coordinate with any other probe 190 (such as probe 190b). Hub 140 may include any suitable type of computer system, such as a network server, any remote server, a mainframe, a workstation, a web space server, a personal computer, a file server, a virtual device, or any other device that may link probes 190 to each other. The functions of hub 140 may be performed by any combination of one or more servers or other components at one or more locations. In the embodiment where the module is a server, the server may be a private server, and the server may be a virtual or physical server. The server may include one or more servers at the same or remote locations. Also, hub 140 may include any component that functions as a server. Hub 140 may represent any suitable set of instructions, logic, or code embodied in a computer readable storage medium and operable to link probes 190 to each other, in certain embodiments.

Hub 140 may also provide access control, in certain embodiments. For example, hub 140 may determine whether a first probe 190 (such as one of probes 190a) is allowed to access (e.g., communicate with, coordinate with, interact with, discover information associated with, etc.) another probe (such as one of probes 190b) based on a permission level of the first probe 190 and/or the other probe. If the first probe 190 does not have the correct permission level to communicate with the other probe 190, hub 140 may prevent the first probe 190 from doing so. Additionally, such access control provided by hub 140 may be further applicable to host devices 170 and controllers 180, thereby allowing or preventing access to host devices 170 and/or controllers 180 (in addition to probes 190). For example, hub 140 may prevent a first controller 180 (such as controller 180a) from accessing another host device and/or another controller (such as controller 180b) if the first controller 180 does not have the correct permission level.

Hub 140 may further link the devices of network 150 to one or more devices of network 130, such as monitoring system 110. For example, hub 140 may be an access point through which communication may pass from monitoring system 110 to one or more devices of network 150 (or vice versa). In such an example, hub 140 may allow monitoring system 110 to access data associated with any device of network 150. Hub 140 also may allow one or more probes 190 to be installed (e.g., downloaded from monitoring system 110 to a host device 170 for installation), reconfigured, reinstalled, uninstalled, and so on, by monitoring system 110. Furthermore, by acting as an access point through which communication may pass from monitoring system 110 to one or more devices of network 150, hub 140 may provide security for network 150.

Although FIG. 1 illustrates hub 140 as being a separate component from the other components of FIG. 1, in certain embodiments, hub 140 may be integrated with any of the other components of FIG. 1. As an example, hub 140 may be integrated with a host device 170 (such as host device 170a). In such an example, instructions, logic, or code associated with central hub 140 may be stored in a memory of memory 176a of host device 170a. This may allow host device 170a (and processor 174a) to perform one or more functions of hub 140 (in addition to one or more functions of controller 180a). Furthermore, while FIG. 1 illustrates only a single hub 140 connecting network 130 to network 150, in certain embodiments, any suitable number of hubs 140 may connect network 130 to network 150. For example, two hubs 140 may connect network 130 to network 150, three hubs 140 may connect network 130 to network 150, ten hubs 140 may connect network 130 to network 150, or any other number of hubs 140 may connect network 130 to network 150.

Additionally, although system 100 is illustrated as including only one hub 140 and one network 130, in certain embodiments, system 100 may include any other number of hubs 140 and networks 130. For example, system 100 may include two hubs 140 and two networks 130, three hubs 140 and three networks 130, ten hubs 140 and ten networks 130, or any other number of hubs 140 and any number of networks 130.

User device 120 represents any components (hardware and/or software) that may display information to a user. User device 120 may include a personal computer, a workstation, a laptop, a wireless or cellular telephone, an electronic notebook, a personal digital assistant, or any other device (wireless, wireline, or otherwise) capable of receiving, processing, storing, and/or communicating information with other components of system 100 in order to display information to user. User device 120 may further allow a user to request information from host devices 170, controllers 180, and/or probes 190. For example, a user may want to view a particular type of information, such as the alerts and/or service messages generated for metrics associated with host devices 170. The user may communicate such a request (using user device 120) to a host device 170 (such as host device 170a), causing a probe 190 (such as one of probes 190a) to provide such information for view by the user. User device 120 may include a user interface, such as a display, a microphone, keypad, or other appropriate terminal equipment usable by the user.

Graphical user interface (GUI) 125 may display any information monitored by probes 190. For example, if a user requests information regarding devices connected to network 150, GUI 125 may display a list of such devices, the IP address of each of the devices, the type of operating system 178 of those devices, the type and number of probes 190 installed on the devices, or any combination of the preceding. As another example, if a user requests information regarding alerts associated with the monitored information, GUI 125 may display each of the alerts that have been generated, how many times those alerts have been generated, the devices those alerts are associated with, the probes associated with those alerts, or any combination of the preceding. GUI 125 may display the monitored information in real time or near real time (e.g., real time plus the time associated with monitoring, communicating, and formatting the information). In such an example, a user may request the monitored information directly from probes 190, and the monitored information may be provided in real time or near real time.

GUI 125 may further display historical (or non-real time) monitored information. In such an example, a user may request the monitored information from the information database 160, and the monitored information may be provided. GUI 125 may display the monitored information in any configuration. Furthermore, GUI 125 may be configured by the user in any manner to display the monitored information.

Information database 160 represents any components that may store information monitored by probes 190. For example, information database 160 may store information monitored by probes 190 and communicated to information database 160 for storage. Information database 160 may include a network server, any remote server, a mainframe, a host computer, a workstation, a web space server, a personal computer, a file server, a virtual device, a database buffer, a database buffer cache, or any other device that may store information monitored by probes 190. The functions of information database 160 may be performed by any combination of one or more servers or other components at one or more locations. In the embodiment where the module is a server, the server may be a private server, and the server may be a virtual or physical server. The server may include one or more servers at the same or remote locations.

In addition to storing information monitored by probes 190, information database 160 may further provide the information for view by a user. For example, a user may send a message to information database 160 that requests particular information from information database 160. As such, information database 160 may gather such information and communicate it for view by a user on user device 120. Furthermore, although system 100 illustrates information database 160 as being connected to network 150, in certain embodiments, information database 160 may be connected to network 130. Information database 160 may also be included in a memory 176 of host device 170 or in a memory of monitoring system 110.

Monitoring system 110, hub 140, and/or any other components of system 100 may be communicatively coupled by network 130. In certain embodiments, network 130 may refer to any interconnecting system capable of transmitting audio, video, signals, data, messages or any combination of the preceding. Network 130 may include all or a portion of a public switched telephone network (PSTN), a public or private data network, a LAN, a MAN, a WAN, a local, regional, or global communication or computer network such as the Internet, a wireline or wireless network, an enterprise intranet, or any other suitable communication link, including combinations thereof, operable to facilitate communication between various components of system 100. Although FIG. 1 illustrates network 130 as being a separate network from network 150, in certain embodiments, network 130 and network 150 may both be the same network.

Monitoring system 110 represents any components that may communicate with hub 140 and/or any other devices connected to network 150, and may be implemented using any suitable combination of hardware, firmware, and software. Monitoring system 110 may include a network server, any remote server, a mainframe, a host computer, a workstation, a web space server, a personal computer, a file server, a virtual device, or any other device that may communicate with hub 140 and/or any other devices connected to network 150. The functions of monitoring system 110 may be performed in any combination of one or more servers or other components at one or more locations. In the embodiment where the module is a server, the server may be a private server, and the server may be a virtual or physical server. The server may include one or more servers at the same or remote locations Modifications, additions, or omissions may be made to system 100 without departing from the scope of the disclosure. Additionally, system 100 may include any number of host devices 170, networks 150, user devices 120, information databases 160, networks 130, and/or monitoring systems 110. Furthermore, any suitable logic may perform the functions of system 100 and the components within system 100.

Figure 2:
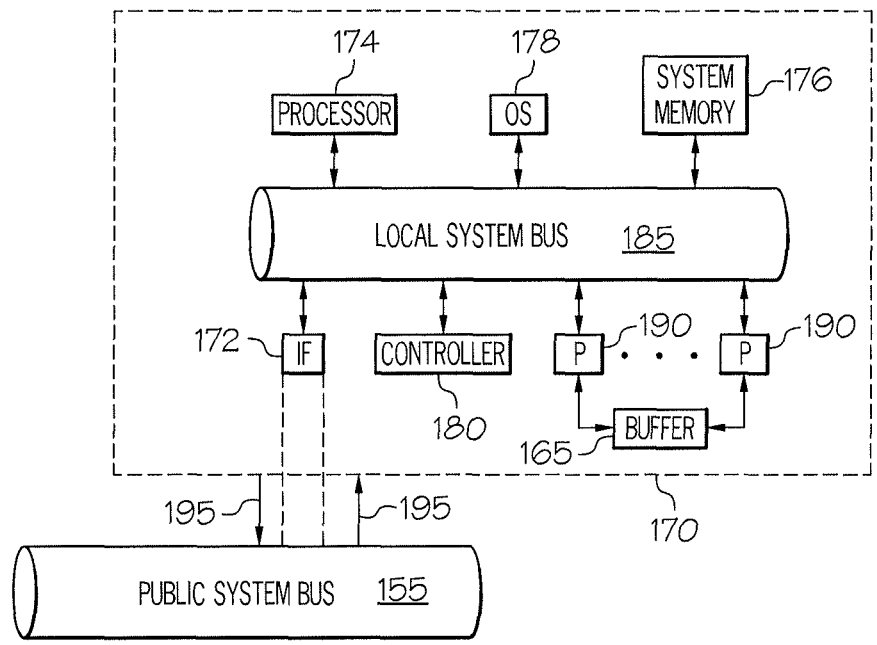
FIG. 2 illustrates an example of a host device with probes for incident-based adaptive monitoring of information in a distributed computing environment according to one embodiment of the present disclosure.

FIG. 2 illustrates an example of a host device 170 with probes 190 for incident-based adaptive monitoring of information in a distributed computing environment according to certain embodiments of the present disclosure. As illustrated, a host device 170 of system 100 (of FIG. 1) may include a network interface 172, processor 174, system memory 176, operating system 178, controller 180, probes 190, and a local system bus 185 and/or another similar architecture operably connecting these components. In general, local system bus 185 facilitates communication between various components of host device 170, such as between probes 190. For example, probes 190 of host device 170 may exchange data for alerts 195 associated with the metric each probe 190 monitors via local system bus 185. The exchanged data may then be used to adapt the monitoring behavior of probes 190.

Additionally, network interface 172 may be communicatively coupled to public system bus 155, allowing the various components of host device 170, such as probes 190, to communicate with any other devices connected to public system bus 155. For example, a probe 190 of host device 170 may utilize public system bus 155 to communicate with and/or interact with another probe (such as one of probes 190b of FIG. 1) of another host device (such as host device 170b of FIG. 1). In such an example, probe 190 may communicate an alert 195 indicating an incident associated with a monitored metric to probe 190b via public system bus 155, and vice versa. Alert 195 may include any suitable combination of current data associated with the monitored metric (such as a current value, metric rating, and/or metric state for a metric) and historical data associated with the monitored metric that is stored in, for example, a buffer 165 (such as a past value, metric rating, and/or metric state for a metric).

In the illustrated embodiment, host device 170 may further include a buffer 165 coupled to probes 190 and operable to store frequently accessed data. Buffer 165 may include a cache for storing data accessed by probes 190 for a predetermined time. For example, buffer 165 may provide storage to a probe 190 so that probe 190 may store historical data associated with a monitored metric, such as past values, metric ratings, and/or metric states for the metric. Although buffer 165 is shown as being internal to host device 170, buffer 165 may be external to host device 170, in certain embodiments. For example, buffer 165 may be included in information database 160 or monitoring system 110, or buffer 165 may be a component separate from any other component of system 100.

Modifications, additions, or omissions may be made to host device 170 without departing from the scope of the disclosure. For example, controller 180 and probes 190 may be integrated. As another example, system memory 176 and buffer 165 may be integrated. Furthermore, host device 170 may include any number controllers 180, probes 190, and/or buffers 165. Additionally, any suitable logic may perform the functions of host device and the components within host device 170.

Figure 3:
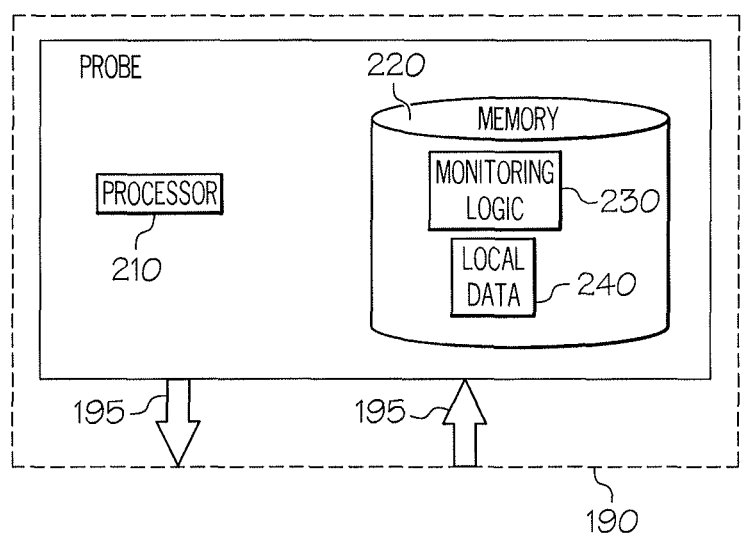
FIG. 3 illustrates an example of a probe for incident-based adaptive monitoring of information in a distributed computing environment according to one embodiment of the present disclosure.

FIG. 3 illustrates an example of a probe 190 for incident-based adaptive monitoring of information in a distributed computing environment according to certain embodiments of the present disclosure. Probe 190 of system 100 (of FIG. 1) represents any components operable to process monitored information associated with a host device 170, and may be implemented using any suitable combination of hardware, firmware, and software. In general, probe 190 facilitates adaptive monitoring of host devices 170 by monitoring a metric associated with host device 170, exchanging data associated with the metric with other probes 190, and adapting a monitoring behavior based on data exchanged between it and the other probes 190.

As illustrated, probe 190 may include a processor 210 and memory 220. Processor 210 communicatively couples to memory 176, and controls the operation and administration of probe 190 by processing information received from host device 170 and memory 210. Processor 210 may be a programmable logic device, a microcontroller, a microprocessor, any processing device, or any combination of the preceding.

Memory 220 stores, either permanently or temporarily, data, operational software, or other information for processor 210. Memory 220 includes any one or a combination of volatile or non-volatile, local or remote devices suitable for storing information. For example, memory 220 may include RAM, ROM, magnetic storage devices, optical storage devices, or any other information storage device or a combination of these devices. While illustrated as including particular modules, memory 220 may include any information for use in the operation of probe 190.

In the illustrated embodiment, memory 220 includes monitoring logic 230 and local data 240. Monitoring logic 230 represents any suitable set of instructions, logic, or code embodied in a computer readable medium and operable to facilitate monitoring a metric associated with host device 170 and storing data associated with the metric in a database of memory 220, such as in local data 240. Local data 240 may represent a buffer, such as a cache buffer, operable to store monitored information. Furthermore, monitoring logic 230 is operable to modify the monitoring behavior of probe 190 based on data associated with the metric and/or data associated with another metric (such as a second metric monitored by another probe of network 150).

In operation, monitoring logic 230 accesses data associated with a metric, determines a metric rating for the metric, and then determines whether the metric rating exceeds an established threshold. If the metric rating exceeds the threshold, monitoring logic 230 may generate and communicate an alert 195 indicating an incident. Monitoring logic 230 may also detect (and/or receive) a new alert 195 generated by another probe 190. For example, monitoring logic 230 may detect a new alert 195 indicating another incident associated with another metric.

In response to generating an alert 195 and/or receiving a new alert 195, monitoring logic 230 may modify the monitoring behavior of probe 190 (as described above with reference to FIG. 1). Modifying a monitoring behavior may include, but is not limited to, updating a monitoring frequency for which data is accessed, monitoring an additional metric associated with a host device 170 (including generating and communicating an updated alert including data associated with the additional metric), listening for a particular type of service message and/or alert generated by other probes 190, communicating a service message associated with a metric, communicating accessed data associated with a metric for a pre-determined time, changing a threshold, and/or any combination thereof.

Modifications, additions, or omissions may be made to probe 190 without departing from the scope of the disclosure. For example, probe 190 may be integrated with a controller 180 and/or host device 170. Additionally, any suitable logic may perform the functions of probe 190 and the components within probe 190.

FIG. 4 illustrates an example of data stored in a database by a probe 190 for incident-based adaptive monitoring of information in a distributed computing environment according to certain embodiments of the present disclosure. As illustrated, stored data 300 may correspond to a metric associated with host device 170 and may indicate modified monitoring behavior of a probe 190. Stored data 300 may represent any information monitored by probe 190 and communicated to one or more databases of system 100 for storage (such as one or more databases of memory 176 (of FIG. 1) and/or memory 220 (of FIG. 3)). A database of system 100 may refer to a buffer, such as a cache buffer, operable to store frequently accessed data.

In the illustrated embodiment, stored data 300 includes columns corresponding to three different data fields associated with the metric (such as time stamp 310, current value 320, and state 330) and rows corresponding to the three different data fields at a given time (indicated by time stamp 310). For example, time stamp 310 may represent a time for which the data was accessed and/or processed to determine various measurements for the metric (such as current value 320 and/or state 330). Current value 320 may represent any measurement for the metric, such as an amount, percentage, or metric rating for metric. In certain embodiments, current value 320 may be compared to an established threshold to determine whether current value 320 indicates an incident. Further, current value 320 may also indicate a metric state 330 of the metric. Examples of metric state 330 include a normal state, warning state, minor-incident state, major-incident state, and critical state.

Current value 320 and/or metric state 330 may cause the monitoring behavior of a probe 190 to be modified. As can be seen in the illustrated example, a monitoring frequency of a probe 190 may be modified based on a metric state 330. For example, the minutes between each time stamp 310 may vary in response to determining a metric state 330 has changed. In such an example, if a metric state 330 changed from a normal state to a warning state, there may be less time between the current time stamp 310 and the subsequent time stamp 310 (e.g., 4 minutes instead of 5 minutes. In the alternative, if a metric state 330 changed from a critical state to a minor-incident state, there may be more time between the current time stamp 310 and the subsequent time stamp 310 (e.g., two minutes instead of one minute).

Although a particular example of data stored in a database by a probe 190 is described, the present disclosure contemplates probe 190 storing any suitable combination of monitored information in any suitable implementation.

Modifications, additions, or omissions may be made to stored data 300. For example, stored data 300 may include data associated with multiple metrics in multiple databases of system 100.

Figure 5:
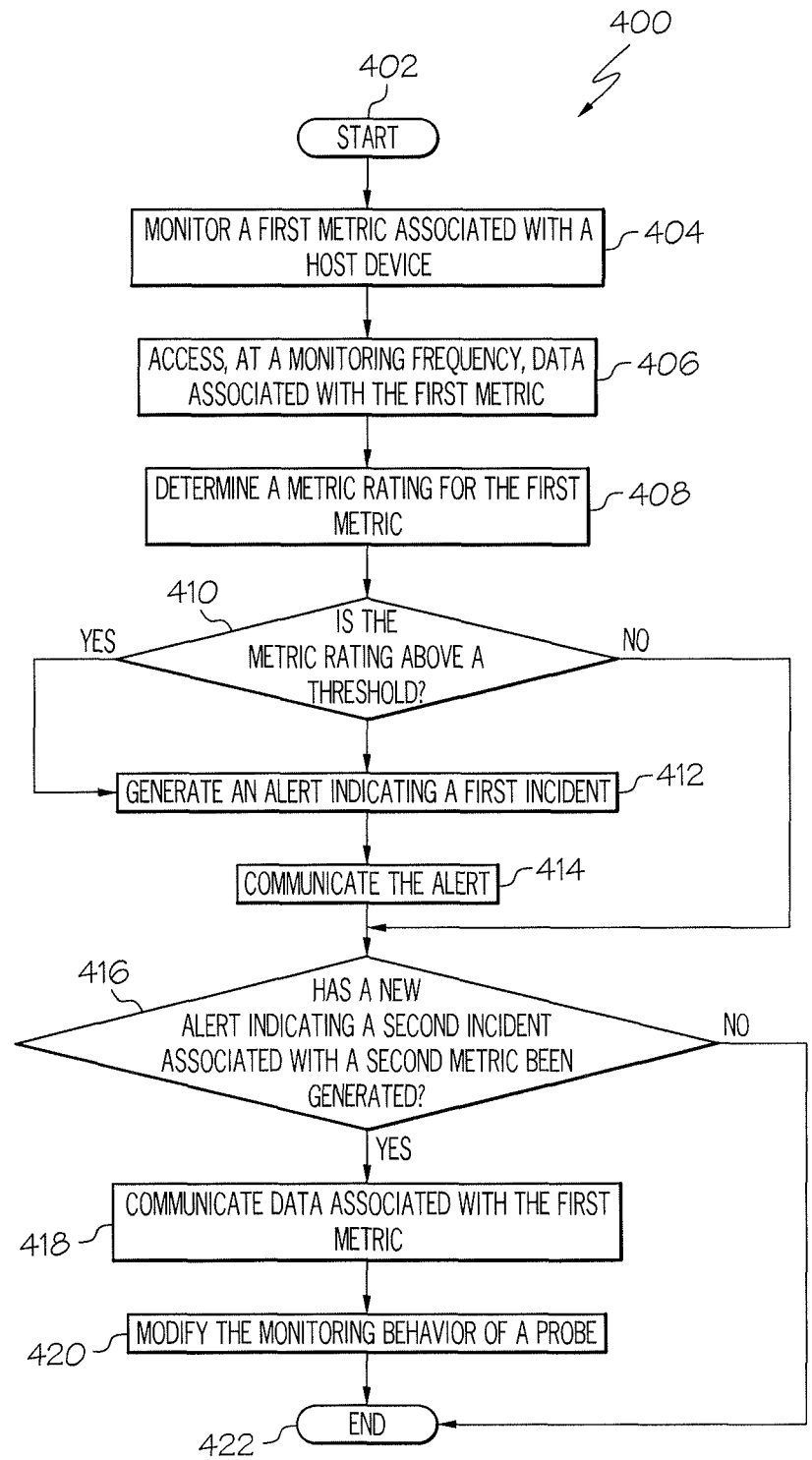
FIG. 5 illustrates an example of a method for incident-based adaptive monitoring of information in a distributed computing environment according to one embodiment of the present disclosure.

FIG. 5 illustrates an example of a method 400 incident-based adaptive monitoring of information in a distributed computing environment according to certain embodiments of the present disclosure. In certain embodiments, one or more steps of method 400 may be performed by probe 190 of FIGS. 1 and 3.

The method begins at step 402. At step 404, a first metric associated with a host device 170 is monitored by a probe 190. Any metric (or information) associated with a host device 170 may be monitored, such as information regarding applications installed on a host device 170, information regarding any host device 170 and/or any other devices connected to one or more networks, information regarding virtualization associated with a host device 170, information regarding storage associated with a host device 170, information regarding cloud computing associated with a host device 170, any other information associated with a host device 170, any other suitable information associated with a host device 170, or any combination of the preceding.

At step 406, data associated with the first metric may be accessed by probe 190 at a monitoring frequency. At least a portion of the data may be communicated to a database of system 100 (of FIG. 1) for storage (such as for later use and/or later reference).

The data may be used by probe 190 to determine a metric rating for the first metric at step 408. The metric rating may refer to a current value, percentage, level, threshold, state, rank, status, and so on, of the first metric. For example, the metric rating may indicate a state of the first metric (e.g. a normal state, warning state, minor-incident state, major-incident state, or critical state). The state of the first metric may further indicate an incident associated with the first metric, in certain embodiments.

At step 410, probe 190 determines whether the metric rating exceeds a threshold established for the first metric (such as a threshold of 80% processor usage). A metric rating that exceeds the threshold may indicate that an incident associated with host device 170 has occurred. In the illustrated embodiment, if the metric rating does not exceed the threshold, the method may move to step 416. On the other hand, if the metric rating is determined to exceed the threshold, the method may proceed to step 412.

At step 412, an alert 195 indicating a first incident may be generated by probe 190 in response to the metric rating being above the threshold. Alert 195 may include the metric rating and at least a portion of data associated with the first metric (e.g., a current measurement of the first metric, historical measurement of the first metric stored in a database of system 100, etc.). In certain embodiments, alert 195 may also include a time stamp (e.g., when the data was accessed and/or when alert 195 was generated), any thresholds established for the first metric (including the threshold the metric rating exceeds), and/or any metadata associated with the first metric (e.g., data describing the first metric, first incident, meaning of the first incident, etc.).

Alert 195 may be communicated to any device of system 100 at step 414. For example, probe 190 may communicate alert 195 to other probes 190 of host devices 170 (via local system bus 185 or public system bus 155), information database 160 (for storage), user device 120, and/or monitoring system 110. Further, alert 195 may be communicated in any suitable manner.

At step 416, a new alert 195 indicating a second incident associated with a second metric may be detected (or received) by probe 190. The second metric may be associated with host device 170 or any other device connected to network 150, such as another host device 170. For example, new alert 195 may have been communicated to probe 190, via local system bus 185, by another probe 190 associated with host device 170. As another example, new alert 195 may have been communicated to probe 190, via public system bus 155, by another probe 190 associated with another host device 170.

New alert 195 may include a metric rating for the second metric and at least a portion of data associated with the second metric (e.g., a current measurement for the second metric, historical measurement for the second metric stored in a database of system 100, etc.). In certain embodiments, new alert 195 may also include a time stamp (e.g., when the data was accessed and/or when new alert 195 was generated), any thresholds established for the second metric (including the threshold the metric rating exceeds), and/or any metadata associated with the second metric (e.g., data describing the second metric, second incident, meaning of the second incident, etc.).

After new alert 195 has been detected (or received), at least a portion of data associated with the first metric may be communicated by probe 190 to the other probes 190 (including the particular probe that generated new alert 195) at step 418. In certain embodiments, the communicated data may be used by the other probes 190 to enhance the monitoring of host devices 170, as described below. Further, the communicated data may be communicated in any suitable format, such as in the form of a service message.

At step 420, a monitoring behavior of probe 190 may be modified (e.g., adapted) based on data exchanged between probe 190 and other probes 190 (e.g., data associated with the first metric and/or data associated with the second metric). For example, the method may modify a monitoring behavior of probe 190 based at least in part on a metric rating for the first metric (e.g., based on whether the metric rating exceeds a threshold, whether an alert 195 has been generated, a metric state indicated by the metric rating, a comparison of a current metric rating and a historical metric rating, etc.). As another example, the method may modify a monitoring behavior of probe 190 based at least in part on detecting (or receiving) a new alert 195 communicated by another probe 190 (e.g., based on another probe 190 determining a metric rating for a second metric exceeds a threshold). In certain embodiments, a monitoring behavior of probe 190 may also be modified based on receiving a service message that includes data associated with a second metric from another probe 190 (e.g., based on another probe communicating at least a portion of data associated with the a metric).

Examples of modifying a monitoring behavior of probe 190 may include: (1) updating a monitoring frequency; (2) monitoring an additional metric associated with a host device 170; (3) changing a threshold for a metric; (4) changing a type of data probe 190 listens for; (5) communicating, via a service message, current data and/or stored data associated with the first metric; (6) having probe 190 continue to communicate data associated with the first metric until probe 190 determines the metric rating for the first metric no longer exceeds the threshold; (7) having probe 190 continue to communicate data associated with the first metric for a pre-determined time after generating an alert and/or detecting a new alert; (8) changing any other monitoring behavior; or (9) any combination thereof.

Although FIG. 5 illustrates method 400 as ending at step 422, in certain embodiments, the method may not end. In particular, instead of method 400 ending, each of steps 404-420 may be repeated. In certain embodiments, probes 190 are designed to repeat steps 404-420 on an ongoing basis. Further, as more and more probes 190 react to a particular incident by generating their own alerts 195, probes 190 may increase their monitoring of one or more metrics by repeating steps 404-420 with an increased frequency. Additionally, or alternatively, as less and less probes 190 react to a particular incident, probes 190 may decrease their monitoring of the one or more metrics by repeating steps 404-420 with a decreased frequency.

Modifications, additions, or omissions may be made to method 400. Additionally, one or more steps in method 400 may be performed in parallel or in any suitable order.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A method, comprising:
monitoring, by a processor associated with a first probe configured to monitor a host device, the first probe being one of a plurality of probes each configured to monitor a corresponding host device to provide adaptive monitoring of information in a distributed computing environment, a first metric associated with the host device;
accessing, at a monitoring frequency, data associated with the first metric;
determining, based on the data, a metric rating for the first metric, the metric rating indicating a state of the first metric, the state comprising one of a normal state, a warning state, a minor-incident state, a major-incident state, and a critical state;
determining, based on the metric rating, whether the metric rating is above a threshold;
generating, if the metric rating is above the threshold, a first alert indicating a first incident, the first alert comprising the metric rating and at least a portion of the data;
communicating, by the processor associated with the first probe, the first alert so that the first alert is available to at least a second probe in the plurality of probes;
continuing to communicate, in response to generating the first alert, data associated with the first metric to a bus for a pre-determined time;
obtaining, by the processor associated with the first probe, information associated with a second alert detected by the second probe in the plurality of probes; and
updating the monitoring frequency based at least in part on the metric rating and the information associated with the second alert detected by the second probe.

2. The method of claim 1, further comprising:
accessing data associated with a second metric if the metric rating is above the threshold, the second metric associated with the host device;
determining, based on the data associated with the second metric, a metric rating for the second metric;
generating an updated alert, the updated alert comprising the metric rating and at least a portion of the data; and
communicating the updated alert.

3. The method of claim 1, further comprising:
receiving a new alert indicating a second incident associated with a second metric, the second metric associated with the host device;
communicating the at least a portion of the data; and
updating the monitoring frequency based at least in part on receiving the new alert.

4. The method of claim 1, wherein updating the monitoring frequency further comprises increasing the monitoring frequency when the metric rating is above the threshold.

5. The method of claim 1, wherein the data associated with the first metric is stored in a buffer, the buffer storing the data for a pre-determined time.

6. The method of claim 1, wherein:
communicating the alert comprises communicating the alert to a bus, the bus accessible to the plurality of probes; and
obtaining the information comprises receiving, via the bus, the information associated with the second alert detected by the second probe.

7. A system, comprising:
a memory operable to store instructions;
a processor associated with a first probe configured to monitor a host device, the first probe being one of a plurality of probes each configured to monitor a corresponding host device to provide adaptive monitoring of information in a distributed computing environment, the processor communicatively coupled to the memory and operable to:
monitor a first metric associated with the host device;
access, at a monitoring frequency, data associated with the first metric;
determine, based on the data, a metric rating for the first metric, the metric rating indicating a state of the first metric, the state comprising one of a normal state, a warning state, a minor-incident state, a major-incident state, and a critical state;
determine, based on the metric rating, whether the metric rating is above a threshold;

generate, if the metric rating is above the threshold, a first alert indicating a first incident, the first alert comprising the metric rating and at least a portion of the data;
communicate the first alert so that the first alert is available to at least a second probe in the plurality of probes;
continuing to communicate, in response to generating the first alert, data associated with the first metric to a bus for a pre-determined time;
obtain information associated with a second alert detected by the second probe in the plurality of probes; and
modify, based at least in part on the metric rating being above the threshold and the information associated with the second alert detected by the second probe, a monitoring behavior of the first probe.

8. The system of claim 7, wherein:
the processor communicates the first alert to a bus, the bus accessible to another probe in the plurality of probes; and
the processor obtains the information associated with the second alert detected by the second probe by receiving the information, via the bus.

9. The system of claim 8, wherein the processor modifies the monitoring behavior of the probe by:
accessing data associated with a second metric, the second metric associated with the host device;
determining, based on the data associated with the second metric, a metric rating for the second metric;
generating an updated alert, the updated alert comprising the metric rating and at least a portion of the data; and
communicating the updated alert to the bus.

10. The system of claim 7, wherein modifying the monitoring behavior of the probe comprises updating the monitoring frequency.

11. The system of claim 7, wherein modifying the monitoring behavior of the probe comprises changing the threshold.

12. The system of claim 7, the processor further operable to:
detect a message communicated to a bus, the message comprising data associated with a second metric, the second metric associated with the host device; and
modify, based at least in part on detecting the message, the monitoring behavior of the probe.

13. The system of claim 7, the processor further operable to:
receive an alert indicating an incident associated with a second metric, the second metric associated with the host device;
communicate the at least a portion of data to a bus, the bus accessible to another probe in the plurality of probes; and
modify, based at least in part on receiving the new alert, the monitoring behavior of the probe.

14. The system of claim 7, further comprising a buffer, the buffer storing the data associated with the first metric for a pre-determined time.

15. A non-transitory computer-readable storage medium having computer-readable program code embodied therewith, the computer-readable program code executable by a computer to cause the computer to:
monitor, by a processor associated with a first probe configured to monitor a host device, the first probe being one of a plurality of probes each configured to monitor a corresponding host device to provide adaptive monitoring of information in a distributed computing environment, a first metric associated with the host device;
access, at a monitoring frequency, data associated with the first metric;
determine, based on the data, a metric rating for the first metric, the metric rating indicating a state of the first metric, the state comprising one of a normal state, a warning state, a minor-incident state, a major-incident state, and a critical state;
determine, based on the metric rating, whether the metric rating is above a threshold;
generate, if the metric rating is above the threshold, first alert indicating a first incident, the first alert comprising the metric rating and at least a portion of the data;
communicate the first alert so that the first alert is available to at least a second probe in the plurality of probes;
continuing to communicate, in response to generating the first alert, data associated with the first metric to a bus for a pre-determined time;
obtaining information associated with a second alert detected by the second probe in the plurality of probes; and
update the monitoring frequency based at least in part on the metric rating and the information associated with the second alert detected by the second probe.

16. The non-transitory computer-readable storage medium of claim 15, wherein the computer-readable program code is further executable by the processor to cause the processor to:
access data associated with a second metric if the metric rating is above the threshold, the second metric associated with the host device;
determine, based on the data associated with the second metric, a metric rating for the second metric;
generate an updated alert, the updated alert comprising the metric rating and at least a portion of the data; and
communicate the updated alert.

17. The non-transitory computer-readable storage medium of claim 15, wherein the computer-readable program code is further executable by the processor to cause the processor to:
receive a new alert indicating a second incident associated with a second metric, the second metric associated with the host device;
communicate the at least a portion of the data; and
update the monitoring frequency based at least in part on receiving the new alert.

* * * * *